(12) United States Patent
Chen et al.

(10) Patent No.: US 9,924,548 B2
(45) Date of Patent: Mar. 20, 2018

(54) VEHICLE CONNECTIVITY USING A DESIRED ACCESS POINT NAME

(71) Applicant: General Motors LLC, Detroit, MI (US)

(72) Inventors: Bonnie Chen, Grapevine, TX (US); Scott T. Droste, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 215 days.

(21) Appl. No.: 14/686,073

(22) Filed: Apr. 14, 2015

(65) Prior Publication Data
US 2016/0309527 A1 Oct. 20, 2016

(51) Int. Cl.
*H04W 76/02* (2009.01)
*H04W 8/20* (2009.01)
*H04W 4/00* (2018.01)
H04W 88/08 (2009.01)
H04W 76/06 (2009.01)

(52) U.S. Cl.
CPC ......... *H04W 76/021* (2013.01); *H04W 4/008* (2013.01); *H04W 8/20* (2013.01); H04W 76/068 (2013.01); H04W 88/08 (2013.01)

(58) Field of Classification Search
None
See application file for complete search history.

(56) References Cited

U.S. PATENT DOCUMENTS

| | | | | |
|---|---|---|---|---|
| 2003/0027554 A1* | 2/2003 | Haumont | ............... | H04M 15/08 455/414.1 |
| 2013/0157659 A1* | 6/2013 | Ikeda | ..................... | H04W 12/08 455/435.1 |
| 2014/0119353 A1* | 5/2014 | McCann | ............. | H04W 76/022 370/338 |
| 2014/0161042 A1* | 6/2014 | Shaw | ...................... | H04W 8/26 370/328 |
| 2014/0226641 A1* | 8/2014 | Kim | ...................... | H04W 4/005 370/338 |
| 2015/0181639 A1* | 6/2015 | Liu | ...................... | H04W 76/027 370/329 |
| 2015/0195364 A1* | 7/2015 | Petersen | ............... | H04W 4/046 713/168 |
| 2015/0208463 A1* | 7/2015 | Yang | ..................... | H04W 48/16 370/329 |

* cited by examiner

Primary Examiner — Benjamin Lamont
(74) Attorney, Agent, or Firm — David Willoughby; Reising Ethington P.C.

(57) ABSTRACT

A communication system and method of using the communication system to determine whether to maintain a connection between a wireless carrier system and a telematics unit in a vehicle. The method includes the steps of: providing a connection request between the vehicle and the wireless carrier system (WCS), wherein the connection request includes a first connectivity identifier; receiving a connection response from the WCS indicating a vehicle-WCS connection, wherein the connection response includes a second connectivity identifier; based on receiving the connection response, determining at the telematics unit whether to maintain the vehicle-WCS connection using the first and second connectivity identifiers; and when the telematics unit determines to not maintain the vehicle-WCS connection, then carrying out one or more actions to terminate the vehicle-WCS connection.

9 Claims, 3 Drawing Sheets

VEHICLE CONNECTIVITY USING A DESIRED ACCESS POINT NAME

TECHNICAL FIELD

The present invention relates to configuring a vehicle to connect to a wireless carrier system using a desired access point name (APN).

BACKGROUND

Wireless service providers provide mobile device users with access point names (APNs) so that device users may utilize wireless carrier systems, thereby gaining utilizing gateways to external networks (e.g., using the internet, third party computer servers, etc.). A connection using the APN between a vehicle telematics device and a provisioning entity may enable the provisioning entity to provide content data to the vehicle. In some instances, the provisioning entity provides content data on a subscription basis to not only the telematics device, but also to other telematics equipped vehicles.

The subscription agreement between the provisioning entity and a user of telematics device may terminate—e.g., due to nonpayment or for other suitable reasons. When this occurs, some wireless carrier systems delete the vehicle's APN and/or other associated information (e.g., from a Home Subscriber Server (HSS) in LTE systems). Should the user renew the subscription agreement and attempt to reconnect to the provisioning entity, the wireless carrier system may inhibit reconnection without restarting the vehicle (and consequently resetting the telematics device). In a vehicle environment, this is undesirable. Thus there is a need for telematics equipment to be able to re-receive content data from the provisioning entity without restarting the vehicle.

SUMMARY

According to an embodiment of the invention, there is provided a method of determining whether to maintain a connection between a wireless carrier system and a telematics unit in a vehicle. The method includes the steps of: providing a connection request between the vehicle and the wireless carrier system (WCS), wherein the connection request includes a first connectivity identifier; receiving a connection response from the WCS indicating a vehicle-WCS connection, wherein the connection response includes a second connectivity identifier; based on receiving the connection response, determining at the telematics unit whether to maintain the vehicle-WCS connection using the first and second connectivity identifiers; and when the telematics unit determines to not maintain the vehicle-WCS connection, then carrying out one or more actions to terminate the vehicle-WCS connection.

According to another embodiment of the invention, there is provided a method of determining whether to maintain a connection between a wireless carrier system and a telematics unit in a vehicle. The method includes the steps of: providing a connection request between the vehicle and the wireless carrier system (WCS), wherein the connection request includes a public access point name (APN); receiving a connection response from the WCS indicating a vehicle-WCS connection, wherein the connection response includes a private APN; in response to receiving the connection response, determining at the telematics unit to not maintain the vehicle-WCS connection based on receiving the private APN in the connection response instead of the public APN; and carrying out one or more actions to terminate the vehicle-WCS connection.

According to another embodiment of the invention, there is provided a method of determining whether to maintain a connection between a wireless carrier system and a telematics unit in a vehicle. The method includes the steps of: providing a connection request between the vehicle and the wireless carrier system (WCS), wherein the connection request includes a public access point name (APN); receiving a connection response from the WCS indicating a vehicle-WCS connection, wherein the connection response includes a WCS message; in response to receiving the connection response, determining at the telematics unit to not maintain the vehicle-WCS connection when the WCS message indicates that the vehicle-WCS connection is not associated with the public APN; and carrying out one or more actions to terminate the vehicle-WCS connection.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

A communication system is described below that enables a vehicle connect with a wireless carrier system using two or more access point names (APNs). One of the APNs may be used solely with a backend system (e.g., a private backend system) while a second APN may be used with a variety of provisioning entities or application service providers. By using a dedicated APN with the backend system, vehicle security may be enhanced. This is particularly true when the vehicle is controllable remotely; e.g., when the vehicle may be remotely unlocked or started by the backend system using the dedicated APN.

As discussed below, some situations arise wherein the wireless carrier network may attempt to use the dedicated APN to connect the vehicle to the wireless carrier network and the entities other than the backend system. A telematics unit of the vehicle can be configured to determine when this has occurred and take corrective action to ensure the dedicated APN is not used with public entities thereby improving information security.

Communications System—

Figure 1:
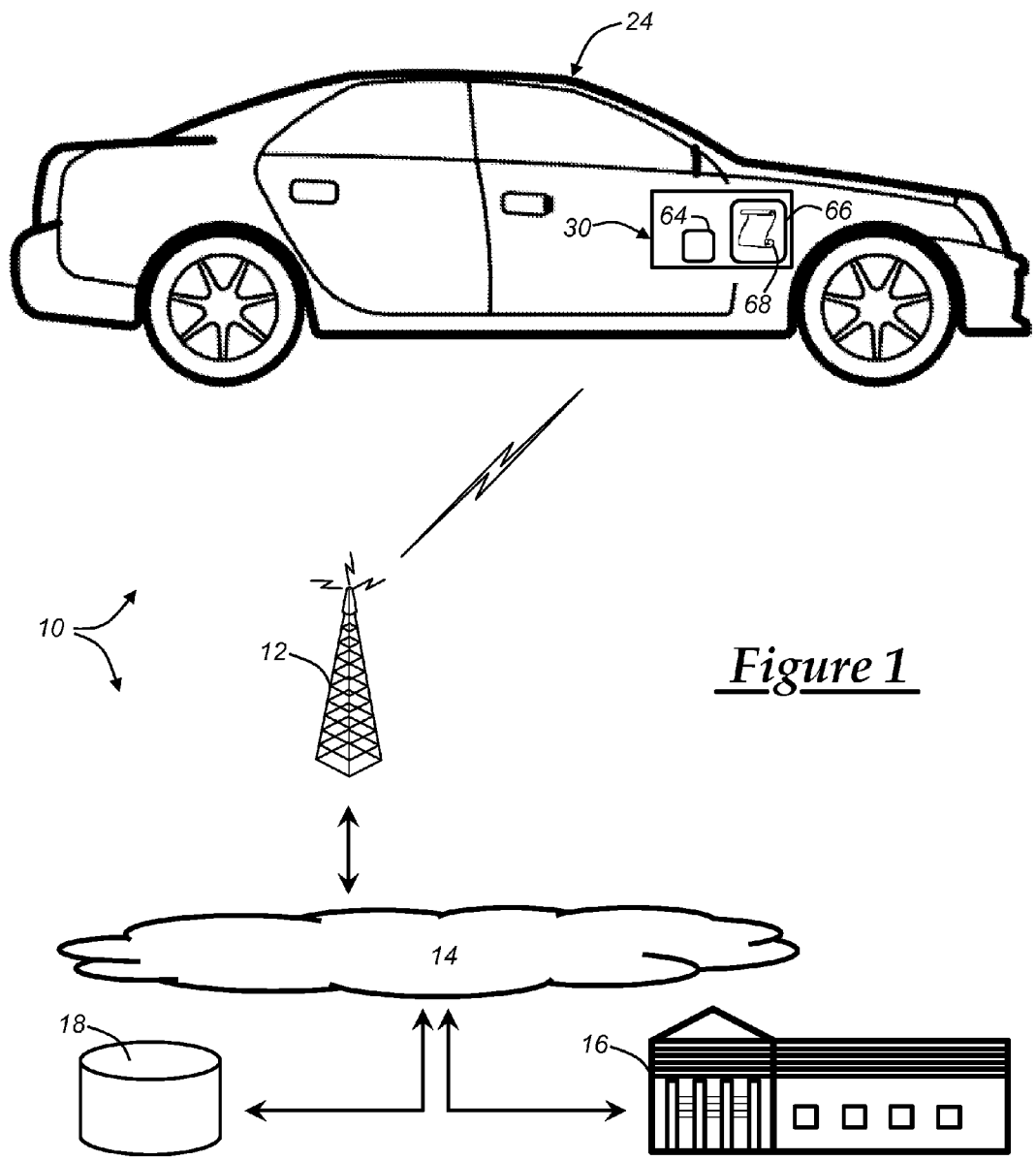
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16; one or more provisioning entities or application service providers 18; and a vehicle 24 equipped with a telematics unit 30 and wirelessly coupled to the carrier system(s) 12. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

According to one embodiment, wireless carrier system (WCS) 12 is a cellular telephone system that includes a plurality of cell towers (only is one shown), one or more mobile switching centers (MSCs), one or more IP routers, one or more IP servers, one or more IP gateways, one or more application servers (not shown), as well as any other networking components required to connect wireless carrier system 12 with land network 14. Each cell tower includes sending and receiving antennas and a base station, with the base stations from different cell towers being connected to the MSC or IP router or IP gateway either directly or via intermediary equipment such as a base station controller. Cellular system 12 can implement any suitable communications technology, including for example, analog technologies such as AMPS, or the newer digital technologies such as CDMA (e.g., CDMA2000) or GSM/GPRS/UMTS/LTE or future wireless technologies. As will be appreciated by those skilled in the art, various cell tower/base station/MSC/IP routers/IP gateways arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Other embodiments of wireless carrier system 12 also exist. For example, the wireless carrier system 12 could be a LTE system as well. Hence, an Evolved Node B (enodeB) can be used instead of a base transceiver station (BTS) [which is used in GSM networks]. A Serving Gateway (S-GW) [of an LTE system] may be used instead of a Serving GPRS Support Node (SGSN) [of the GSM system], a Packet Gateway or PDN Gateway (P-GW) [LTE] may be used instead of a Gateway GPRS Support Node (GGSN) [GSM], a Home Subscriber Server (HSS) [LTE] may be used instead of a Home Location Register (HLR) [GSM], etc. These are merely examples to illustrate that the wireless carrier system 12 may be of any suitable type, including systems now in use, as well as future systems which may be used or developed.

Figure 2:
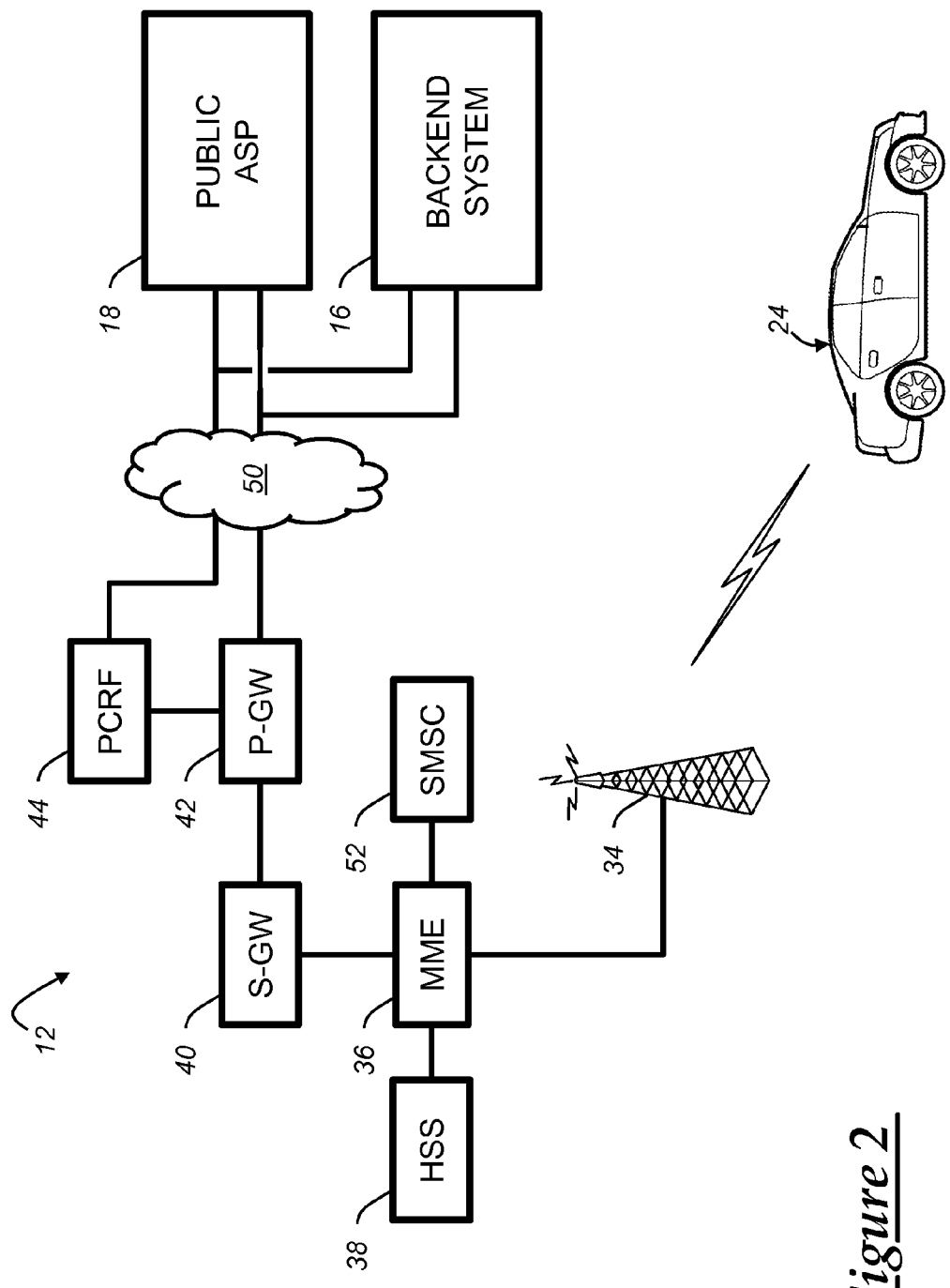
FIG. 2 is a schematic diagram illustrating a portion of the communications system of FIG. 1.

In FIG. 2, some components of an LTE wireless carrier system 12 are shown. For example, an enodeB 34 is shown in wireless communication with vehicle 24. The enodeB 34 is coupled to both an HSS 38 and a S-GW 40. The S-GW 40 is shown connected to a P-GW 42 which is also coupled to Policy & Charging Rules Function (PCRF) 44. Both P-GW 42 and PCRF 44 are coupled to the backend system 16 and ASP 18 via internet 50.

It should be appreciated that non-LTE components may interface to LTE wireless carrier systems, such as a Short Message Service Center (SMSC) 52 coupled to the MME 36. This also is merely an example; other non-LTE components may be connected or interact with the LTE system as well. Components of wireless carrier system 12 such as the enodeB 34, the MME 36, S-GW 40, the HSS 38, the P-GW 42, the PCRF 44, the internet 50, the SMSC 52, etc. are known to skilled artisans and will not be elaborated additionally here.

Returning to FIG. 1, apart from using wireless carrier system 12, a different wireless carrier system in the form of satellite communication can be used to provide uni-directional or bi-directional communication with the vehicle. This can be done using one or more communication satellites and an uplink transmitting station. Uni-directional communication can be, for example, satellite radio services, wherein programming content (news, music, etc.) is received by transmitting station, packaged for upload, and then sent to the satellite, which broadcasts the programming to subscribers. Bi-directional communication can be, for example, satellite telephony services using satellite to relay telephone communications between the vehicle 24 and uplink transmitting station. If used, this satellite telephony can be utilized either in addition to or in lieu of wireless carrier system 12.

Land network 14 may be a conventional land-based telecommunications network that is connected to one or more landline telephones and connects wireless carrier system 12 to backend system 16 and ASP(s) 18. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, backend system 16 and ASP(s) 18 need not be connected via land network 14, but could include wireless telephony equipment so that it can communicate directly with a wireless network, such as wireless carrier system 12.

Backend system 16 may include one or more computer servers and a data service center. Backend system 16 is designed to provide the vehicle 24 with a number of different system back-end functions (e.g., providing vehicle navigation services, vehicle concierge services, entertainment content data, and infotainment content data). In addition, backend system 16 generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, UMTS, LTE, and future wireless technologies and the like. Although one embodiment has been described as it would be used in conjunction with a manned data service center using a live advisor, it will be appreciated that the data service center of backend system 16 can instead utilize VRS as an automated advisor or, a combination of VRS and a live advisor can be used.

ASP 18 may be any suitable entity capable of providing content data to the vehicle 24 according to a subscriber or subscription agreement. The content data or internet content provided by ASP 18 broadly includes any textual, visual, or aural content transmitted over the World Wide Web, data conveyed using various communication means (e.g., e-mail, Internet telephony, SMS, video, multimedia, etc.), and data conveyed using various data transfer means (e.g., including file sharing, streaming media, etc.). Thus, internet content also includes: local and regional events and information, news and financial data, location data, social relation data, pop-culture information, sports and entertainment information, fitness data, on-line shopping data, just to name a few examples. One commercially available public ASP 18 is Pandora™ providing streaming music; another is Major League Baseball (MLB™) providing play-by-play of live Major Leagues games. These of course are merely examples; other examples exist.

ASP 18 may be available to the general public and may such receive payments from its subscribers, establish payment arrangements, and provide promotional arrangements or offers to subscribers, just to name a few examples. ASP 18 also may account and log such payments or the absence thereof. As will be discussed in greater detail below, the ASP 18 may interact with the wireless carrier system 12—e.g., notifying the wireless carrier system 12 or a wireless service provider (e.g., using the WCS 12) when the subscriber needs to purchase a data plan, data credits, or the like.

ASP 18 may provide services using live personnel and/or computer interfaces (e.g., application software). ASP 18 can include one of a number of computers or servers accessible via a network such as the internet. Each such server can be used for one or more purposes, such as a web server accessible via land network 14 and/or wireless carrier 12.

Vehicle 24 is depicted in the illustrated embodiment as a passenger car, but it should be appreciated that any other vehicle including motorcycles, trucks, sports utility vehicles (SUVs), recreational vehicles (RVs), marine vessels, super carrier, train aircraft, etc., can also be used. Vehicle 24 may include electronics such as a microphone, speakers, one or more pushbuttons or other control inputs, a vehicle head unit or entertainment unit, one or more visual displays, a number of vehicle system modules (VSMs) for controlling or regulating various vehicle subsystems, and the telematics unit 30 for carrying out vehicle communications as well as performing other vehicle functions. The head unit, VSMs, telematics unit, and other devices may be interconnected or electrically coupled by one or vehicle communication networks (e.g., by wired bus(es) or by one or more short range wireless communication (SRWC) networks).

Telematics unit 30 can be an OEM-installed (embedded) or aftermarket device that is installed in the vehicle and that enables wireless voice and/or data communication over wireless carrier system 12 and via wireless networking. This enables the vehicle 24 to communicate with backend system 16, ASP 18, other telematics-enabled vehicles (not shown), or some other entity or device. Telematics unit 30 preferably uses radio transmissions to establish a communications channel (a voice channel and/or a data channel) with wireless carrier system 12 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the backend system 16) and data communication (e.g., to provide GPS location data or vehicle diagnostic data to the backend system 16), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, UMTS or LTE standards or IEEE 802.11x standards and thus includes a standard cellular and/or IEEE 80211x chipset for voice communications like hands-free calling, a wireless modem (not shown) for data transmission, an electronic processing device or processor 64, one or more digital memory devices 66, and a dual antenna (not shown). It should be appreciated that the modem can either be implemented through software 68 (stored on memory 66) and is executed by processor 64, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 30 can be configured with a static IP address or can set up to automatically receive an assigned IP address from another device on the network such as a router or from a network address server.

Processor 64 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 64 executes various types of digitally-stored instructions, such as software or firmware programs 68, which enable telematics unit 30 to provide a wide variety of services. For instance, processor 64 can execute programs or process data to carry out at least a part of the method discussed herein.

The memory 66 may include computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one embodiment, memory 66 is a non-transitory computer readable medium.

Telematics unit 30 can be used to provide a diverse range of vehicle services that involve wireless communication to and/or from vehicle 24. Such services include: turn-by-turn directions and other navigation-related services that are provided in conjunction with the GPS-based vehicle navigation module; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions 68 saved internal or external to telematics unit 30, they could be hardware components located internal or external to telematics unit 30, or they could be integrated and/or shared with each other or with other systems located throughout vehicle 24, to cite but a few possibilities. In the event that the modules are implemented as VSMs located external to telematics unit 30, they could utilize a vehicle data bus to exchange data and commands with the telematics unit.

In at least one embodiment, ASP 18 is an entity accessible by vehicle 24 and any other telematics-equipped vehicle that is configured to receive data over a data connection, whereas backend system 16 is a private entity accessible to vehicles having specially-configured telematics units. For example, a specially-configured telematics unit may be one that is configured with a public access point name (APN) and a private APN. It will be appreciated that communication devices (e.g., user equipment or UE) are configured generally with a single access point name (APN). However, in this specially-configured implementation, the telematics unit 30 may enable connection with backend system 16 only via private APN, whereas telematics unit 30 may enable connection to other entities or devices (such as ASP 18) using the public APN. By using a dedicated (private) APN, vehicle communication security is increased since opportunities for malicious attack are decreased when the private APN is not used in venues or via communication paths likely to be accessible to such attackers (or hackers). It should be appreciated that the wireless carrier system 12 may be indifferent to which APN is used; thus, whether the private APN is actually dedicated may depend upon the configuration of telematics unit 30.

The identities of the public APN and the private APN may differ. For example, the private APN of telematics unit 30 may be designated 'backend_APN' while the public APN may be designated 'consumer_APN.' These of course are merely examples; other implementations are possible.

Method—

Figure 3:
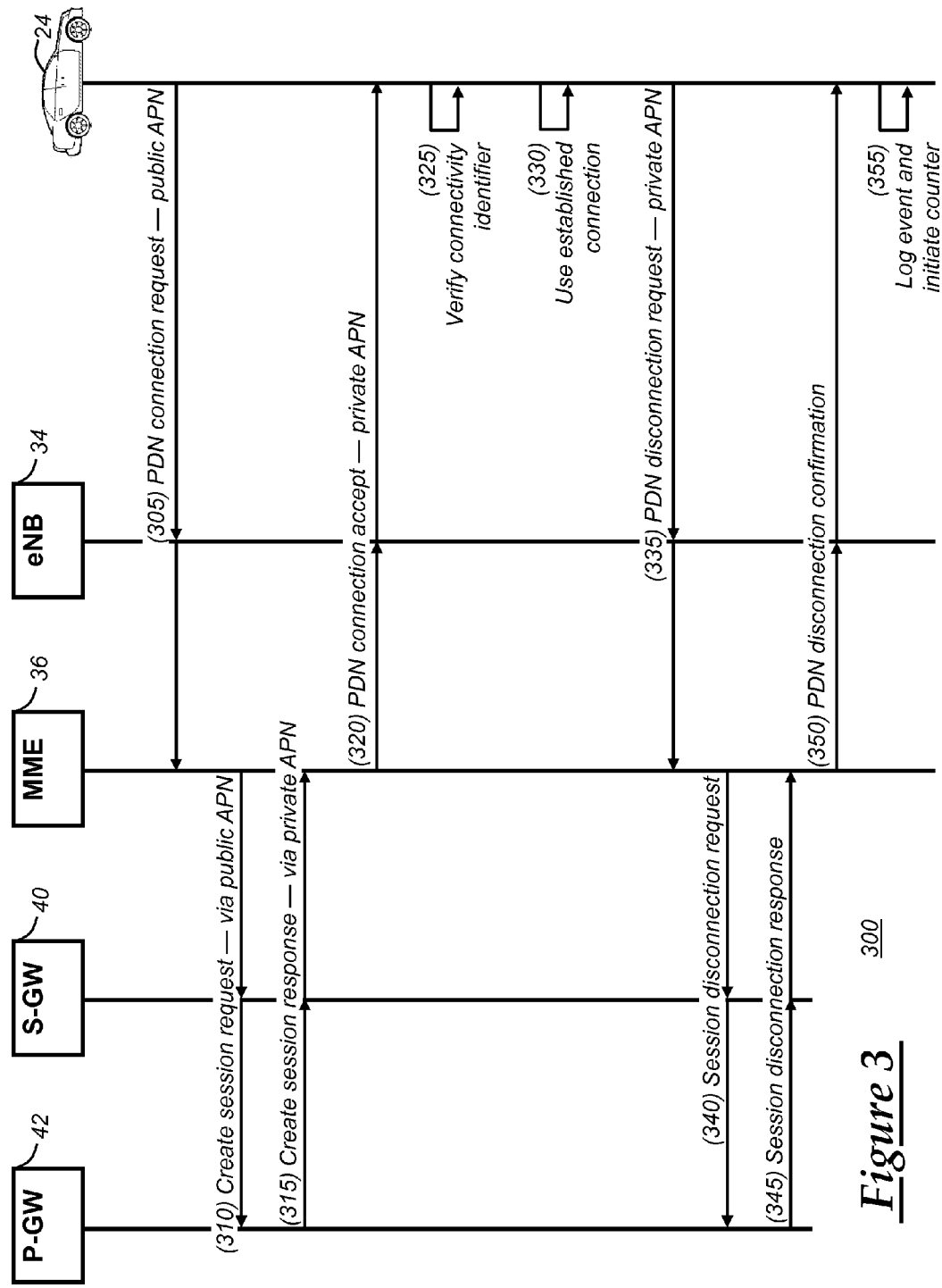
FIG. 3 is a flow diagram illustrating a method of using the communications system shown in FIGS. 2 and 3.

Turning now to FIG. 3, there is shown a method 300 of vehicle 24 interaction with the LTE communication architecture shown in FIGS. 1 and 2. And while the method is described with respect to an LTE wireless carrier system 12, it will be appreciated that the vehicle 24 may similarly interact with WCDMA, GSM, or any other suitable architectures. The vehicle telematics unit 30 in method 300 is configured with both a public APN (e.g., 'consumer_APN') and a private APN (e.g., 'backend_APN'). In general, vehicle 24 and/or telematics unit 30 seeks to establish a data connection with public ASP 18 (e.g., to receive content data). In at least one embodiment, vehicle 24 previously received content data from APS 18—e.g., ASP 18 previously having a subscriber relationship with a user of vehicle 24. In the subscriber relationship, the user is expected to provide valuable consideration such as credits or monies in exchange for the ASP 18 providing content data—e.g., such as a predetermined amount of data (e.g., in Gigabytes or Gb) or for a predetermined period of time (e.g., per month, per year, etc.). In at least one embodiment, prior to the first step of method 300, ASP 18 has de-activated the vehicle user's ASP account—e.g., the account is in an inactive status and/or the ASP has discontinued providing content data due to a depletion or otherwise absence of consideration (e.g., the credits or monies have been consumed and more credits or monies are now due). In at least one embodiment, the user of the telematics-equipped vehicle 24, following an ignition cycle, discovers a lack of connectivity to connect to ASP 18 due to the depletion, and using the telematics unit 30, the user attempts to re-establish the connectivity (in the first method step).

In some embodiments, the ASP 18 will notify the wireless carrier system 12 when the user has depleted its credits, monies, etc. In turn, the system 12 may update the status of the vehicle 24 in the HSS 38. Some carrier systems 12 will delete, overwrite, or otherwise remove subscriber data stored in the HSS 38 (e.g., considering this subscriber data 'inactive'); e.g., where vehicle 24 was previously using the public APN to receive content data from ASP 18, the public APN and other associated vehicle may be deleted from HSS 38. However, where the backend system 16 continues (at least occasionally) to use the private APN, this subscriber data may continue to be stored in HSS 38 (e.g., as active).

The method 300 begins with step 305—the vehicle 24 (more specifically, telematics unit 30) sends a packet data network (PDN) connection request to the wireless carrier system 12. In this step, the PDN connection request may be received by enodeB 34 and in turn, be delivered to MME 36. The PDN connection request may include a first connectivity identifier. In at least one embodiment, the first connectivity identifier is the vehicle's public APN.

In response to step 305, MME 36 may create and send a session request to the P-GW 42 (e.g., via S-GW 40) [step 310]. The session request also may pass along the first connectivity identifier (e.g., the vehicle's public APN).

When the P-GW 42 receives the session request, it may query the HSS 38 for subscriber account data, e.g., associated with the vehicle's public APN. As discussed above, in some implementations, all or some of the subscriber account data may be deleted at the HSS when the ASP 18 determined that the vehicle's subscriber account credits were consumed or depleted. Thus, in at least one implementation, the P-GW 42 may seek subscriber account data associated with the vehicle's public APN provided by vehicle 24 but may not find it. It may however discover another APN associated with vehicle 24 (e.g., the private APN)—which may be active and used by vehicle 24 with backend system 16. Some wireless carrier systems 12 may be configured to acknowledge the session request with whatever active APN is present in the subscriber's account. Thus, in the absence of a PDN connection using the public APN, wireless carrier system 12 may allow connection using the private APN, instead of the requested public APN. Normally, this may be desirable, as it enables user connectivity even though one of the APNs is inactive.

Thus in response to step 310, P-GW 42 may create and send an affirmative session response to the MME 36 (e.g., via S-GW 40) using the private APN [step 315]. The session response includes a second connectivity identifier. In one embodiment, the second connectivity identifier is an active APN (e.g., in this example, the private APN). In other embodiments, the second connectivity identifier is a wireless carrier system (WCS) message. A non-limiting example of a WCS message is a communication that includes an integrated services digital network (ISDN) cause code. As appreciated by skilled artisans, cause codes are preconfigured messages represented by a code; one such example of a cause code is binary "1010110" or decimal "86" indicating a "call having the requested call identity has been cleared." This of course is merely an example; other types of WCS messages are possible and other cause codes may be used. Thereafter, method 300 may proceed to step 320.

In step 320, MME 36 may send a PDN connection acceptance to vehicle 24 (e.g., via enodeB 34). This acceptance assumes vehicle 24 will utilize the private APN considered to be active by the system 12, as discussed above. In addition, the acceptance includes the second connectivity identifier.

Next, in step 325, vehicle 24 may verify the received (second) connectivity identifier. The second connectivity identifier may either be correlated to the public APN sent to the system 12 in step 305 or it may not be correlated. In instances where the second connectivity identifier can be correlated, the method proceeds to step 330 allowing vehicle 24 to use the established connection to receive content data (e.g., over a data connection). For example, should the second connectivity identifier be the public APN or a WCS message indicating the public APN is being used, telematics unit 30 may be determine that the second connectivity identifier correlates to the public APN sent with the PDN connection request sent in step 305. Therefore, the vehicle thereafter may receive content data using the public APN and the method 300 ends.

However, in verification of step 325, telematics unit 30 may determine that the second connectivity identifier does not correlate to the public APN sent with the PDN connection request sent in step 305. This determination may occur in a number of different ways. For example, if the second connectivity identifier in the PDN connection acceptance (step 320) is the private APN, then telematics unit 30 may compare the public APN to the private APN and determine that the APNs do not match. Or for example, if the second connectivity identifier in the PDN connection acceptance (step 320) is a WCS message, then telematics unit 30 may compare the public APN to the WCS message and, based on the nature or content of the message, may determine that the public APN is not being used by the wireless carrier network 12. This WCS message should be broadly construed to include any message not consistent (or correlate-able) to use of the public APN (sent in the PDN connection request of step 305). For example, if the WCS message suggests use of a different APN (than the request) or suggests that the identity of vehicle 24 (or the first connectivity identifier) is not known, telematics unit 30 may determine a lack of correlation between the PDN connection request and the carrier system's response. Regardless of how this occurs, when verification fails in step 325, method 300 proceeds to step 335.

In response to a failure to verify the second connectivity identifier in step 325, the vehicle (telematics unit 30) sends a PDN disconnection request to the wireless carrier system 12 which is received by MME 36 via enodeB 34 [step 335]—the telematics unit 30 being configured to avoid use of its private APN with ASP 18 or like entities. The PDN disconnection request may include the private APN which the vehicle wishes to disconnect or any other suitable information associated with a disconnection using the private APN (e.g., data of the connectivity identifier received in step 320).

Next in step 340, MME 36 may create and send a session disconnection request to the P-GW 42 (e.g., via S-GW 40). The session request also may pass along the vehicle's private APN (and/or the other suitable information). In other embodiments, prevention or termination of the undesired vehicle-WCS connection may be carried out differently.

And in response to step 340, P-GW 42 may create and send a session disconnection response to the MME 36 (e.g., via S-GW 40) [step 345]. The disconnection response may indicate that the connection using the private APN is terminated. Method 300 then proceeds to step 350.

In step 350, MME 36 may send a PDN disconnection confirmation to vehicle 24 (e.g., via enodeB 34). This confirmation advises the vehicle 24 that its private APN is not being used with public ASP 18 or the like. The private APN is not inactive however; e.g., it is still available for use with the backend system 18.

In step 355, vehicle 24 may log an incorrect PDN connection event. This event may enable vehicle technicians later to diagnosis and analyze the event. Logged data may be stored in memory 66 or in any suitable VSM memory. Step 355 also may include a reconnection attempt cycle that includes initiating a reconnect counter to count to a predetermined value. When the predetermined value is reached, the vehicle 24 may re-attempt steps 305-325 (e.g., re-providing the first connectivity identifier (e.g., the public APN) to the carrier system 12 and seeking to receive a verifiable PDN connection acceptance). The counter may count time or any number of cycles in or at the vehicle. For example, the counter may count clock time, door-open and close cycles, etc. Predetermined values may pertain to counting during a single ignition cycle (i.e., while the vehicle 24 remains ON). For example, it has been determined that when the vehicle is turned OFF and then ON again, the wireless carrier systems 12 which deleted at least a part of the subscriber account data, will recognize the public APN. Thus, any reconnection attempt may occur during the same ignition cycle.

In light of the above description, it will be apparent that in at least one embodiment, a vehicle telematics unit may store and use at least two different APNs—a private APN for accessing a backend system and a public APN for use with all other provisioning entities or application service providers. The telematics unit may be configured to determine when a wireless carrier system attempts to connect the vehicle to an entity other than the backend system using the public APN. When this occurs, the telematics unit may take corrective action in order to terminate this connection. The methods described herein enhance vehicle security by limiting the ability of malicious attackers to intercept and use the private APN.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining whether to maintain a connection between a wireless carrier system and a telematics unit in a vehicle, comprising the steps of:
providing a connection request between the vehicle and the wireless carrier system (WCS), wherein the connection request includes a first connectivity identifier, and wherein the first connectivity identifier includes a public access point name (APN) for use with at least one public application service provider (ASP);
receiving a connection response from the WCS indicating a vehicle-WCS connection, wherein the connection response includes a second connectivity identifier, wherein the second connectivity identifier is the public APN or a private APN for use with a vehicle backend system, wherein the second connectivity identifier is associated with a subscriber account stored in the WCS that permits cellular connections for use by the vehicle based on whether the public APN or the private APN is activated, wherein the WCS is configured to establish the vehicle-WCS connection using the public APN when the public APN is activated for use by the vehicle such that the second connectivity identifier is the public APN, and wherein the WCS is configured to establish the vehicle-WCS connection using the private APN when the public APN is not activated for use by the vehicle such that the second connectivity identifier is the private APN;
based on receiving the connection response, determining at the telematics unit whether a vehicle-WCS connection to the public ASP is permitted based on whether the first connectivity identifier correlates to the second connectivity identifier; and
when the telematics unit determines that the first connectivity identifier does not correlate to the second connectivity identifier, then sending a packet data network (PDN) disconnection request to the WCS that prevents the vehicle from using the private APN with the at least one public ASP.

2. The method of claim 1, wherein the connection response included the private APN due to a prior de-activation event of a subscriber account at the WSC, wherein the subscriber account is associated with the vehicle telematics unit.

3. The method of claim 2, wherein the prior de-activation event included deleting data associated with at least a portion of the subscriber account.

4. The method of claim 1, wherein, when the second connectivity identifier includes a WCS message indicating that the public APN is not being used in the vehicle-WCS connection, then the telematics unit determines to not maintain the vehicle-WCS connection.

5. The method of claim 4, wherein the WCS message is a cause code.

6. The method of claim 4, wherein the WCS message is associated with a prior de-activation event of a subscriber account at the WSC, wherein the subscriber account is associated with the vehicle telematics unit.

7. The method of claim 6, wherein the prior de-activation event included deleting data associated with at least a portion of the subscriber account.

8. The method of claim 1, further comprising storing diagnostic data associated with the PDN disconnection request.

9. The method of claim 1, further comprising initiating a reconnection attempt cycle, wherein the reconnection attempt cycle includes providing a second connection request following a predetermined period.

* * * * *